(No Model.)

J. N. WHITMAN & T. A. TAYLOR.
CHANNELING AND GROOVING KNIFE.

No. 277,092. Patented May 8, 1883.

Witnesses.
Henry Chadbourn
F. Allen.

Inventors:
James N. Whitman
Thomas A. Taylor.
by Alban Andrew their atty

UNITED STATES PATENT OFFICE.

JAMES N. WHITMAN AND THOMAS A. TAYLOR, OF BEVERLY, MASS.

CHANNELING AND GROOVING KNIFE.

SPECIFICATION forming part of Letters Patent No. 277,092, dated May 8, 1883.

Application filed October 27, 1882. (No model.)

*To all whom it may concern:*

Be it known that we, JAMES N. WHITMAN, a citizen of the United States, residing at Beverly, in the county of Essex and State of Massachusetts, and THOMAS A. TAYLOR, a citizen of Great Britain, now residing at Beverly, Essex county, Massachusetts, have jointly invented certain new and useful Improvements in Channeling and Grooving Knives; and we do hereby declare that the same are fully described in the following specification and illustrated in the accompanying drawings.

This invention relates to improvements in channeling and grooving knives for channeling and grooving soles of boots and shoes, and manner of securing and adjusting such knives to the frame of the machine.

The invention is carried out as follows, reference being had to the accompanying drawings, on which—

Figure 1:
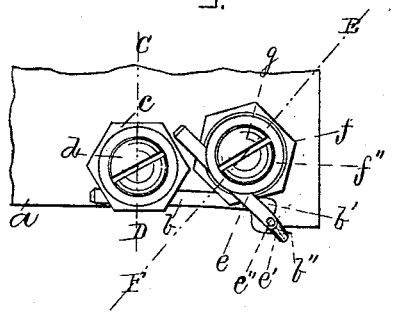
Figure 2:
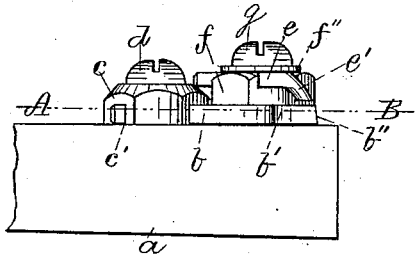
Figure 3:
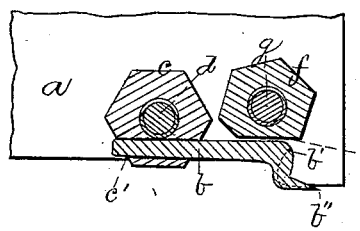
Figure 4:
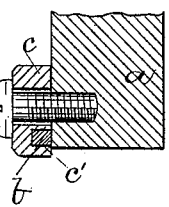
Figure 5:
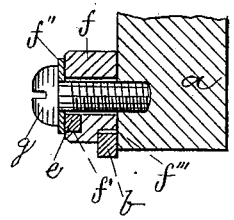
Figure 6:
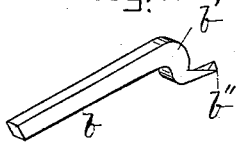
Figure 7:
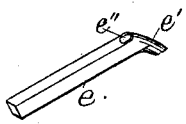

Figure 1 represents a front elevation of the invention, and Fig. 2 represents a bottom view of the same. Fig. 3 represents a longitudinal section on the line A B, shown in Fig. 2. Fig. 4 represents a cross-section on the line C D, shown in Fig. 1; and Fig. 5 represents a cross-section on the line E F; also shown in Fig. 1. Figs. 6 and 7 represent perspective views of the channeling and grooving knives, respectively.

Similar letters refer to similar parts wherever they occur on the different parts of the drawings.

$a$ represents a portion of the frame of an ordinary channeling and grooving machine to which the knives are to be attached.

$b$ represents the channel-knife, which is made of a rod or bar of steel, as shown in Fig. 6, with a bend at $b'$, and a cutting-edge, $b''$, in its outer end, as shown.

The device for securing said channel-knife to the frame $a$ is made as follows: $c$ is a nut or washer provided on its under side with a groove, $c'$, of a sufficient size to receive the shank $b$ of the channel-knife and to allow of a lateral adjustment of said shank in the said groove. $d$ is a clamping-screw passing through a perforation in the nut or washer $c$ and afterward screwed into the frame $a$, as shown in Fig. 4. By means of the clamping-screw $d$, the notched nut or washer $c$, and bar-knife $b$ a very easy adjustment is obtained for said channel-knife, both in the direction of the notch or groove $c'$ as well as in a swinging motion around the axis of the screw $d$ to compensate for the depth and size and location of the desired channel to be made in the boot or shoe sole. The grooving-knife or groover is also made of a bar or rod, $e$, of steel, and provided with an angular or curved end, $e'$, having a straight or curved perforation, $e''$, through such end, as shown in Fig. 7.

The groover is secured in an adjustable manner to the frame $a$, as follows: $f$ is a nut or washer, with a groove or recess, $f'$, in its upper part, such recess being made of sufficient size to allow the shank $e$ of the groover to be inserted therein, and to be adjusted forward and back within said recess $f'$. $f''$ is a washer resting loosely on top of the nut or washer $f$ and groover $e$, as shown in Fig. 5, and $g$ is a clamping-screw passing through the washer $f''$ as well as through the nut or washer $f$, and is screwed into the frame $a$, as shown in Fig. 5, by which means the groover $e$, after being adjusted to its proper position laterally within the recess $f'$ or around the axis of the screw $g$, is firmly secured to the frame $a$, as shown. At $f'''$, on the under side of the nut or washer $f$, is made an offset or recess, as shown in Fig. 5, to enable the channel-knife $b$ to be additionally secured to the frame $a$ by being clamped by the nut or washer $f$.

If so desired, the invention may be modified as follows: The shanks of the channel-knife and the groover may be bent or curved in a circular or horseshoe shape, so as to form, as it were, a washer on the end of each such tools, when we may be able to dispense with the washers $c$ and $f$; but we prefer to carry out the invention in the manner as shown in the drawings; also, if so desired, the groove or recess $f'$ on the nut or washer $f$ may be made on the under side instead of on the top of the latter, in which case the shank of the groover would be clamped against the shank of the channel-knife or against the frame $a$; but the device and arrangement as shown in Fig. 5 are preferable.

In this manner we produce channel and grooving knives of a very simple and strong construction, and by the adjusting and holding device as shown and described we are enabled to adjust such knives with great ease in lateral and swinging positions to suit any required depth and location of channel and groove on the shoe-sole, as well as to secure said tools to the frame $a$ with ease and with great firmness.

What we wish to secure by Letters Patent, and claim, is—

1. The bar or rod channel-knife $b\ b'\ b''$, in combination with the nut or washer $c$, provided with a groove or recess, $c'$, and clamping-screw $d$, as and for the purpose set forth.

2. The bar or rod groover $e\ e'\ e''$, in combination with the nut or washer $f$, provided with a groove or recess, $f'$, washer $f''$, and clamping-screw $g$, as and for the purpose set forth.

3. In combination, the bar or rod channel-knife $b\ b'\ b''$, its nut or washer $c$, provided with a groove, $c'$, and clamping-screw $d$, and the bar or rod groover $e\ e'\ e''$, its nut or washer $f$, having recesses $f'\ f''''$, washer $f''$, and clamping-screw $g$, as and for the purpose set forth and described.

In testimony whereof we have affixed our signatures in presence of two witnesses.

JAMES N. WHITMAN.
THOMAS A. TAYLOR.

Witnesses:
ALBAN ANDRÉN,
HENRY CHADBOURN.